Patented Feb. 26, 1952

2,586,837

UNITED STATES PATENT OFFICE 2,586,837

PREPARING DIANISIDINE

Adrian L. Linch, Wilmington, Del., assignor to E. I. du Pont de Nemours & Company, Wilmington, Del., a corporation of Delaware No Drawing. Application September 28, 1950, Serial No. 187,343

12 Claims. (Cl. 260—571)

This invention relates to an improved process for preparing dianisidine and, more particularly, to a process for preparing substantially colorless dianisidine from hydrazoanisole.

Dianisidine is a valuable intermediate for the production of azo dyestuffs and for other purposes, and has the formula:

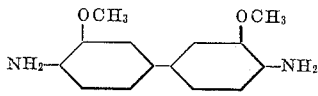

It is commonly prepared by the action of a dilute aqueous solution of a strong non-oxidizing mineral acid on hydrazoanisole which has the formula:

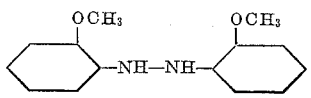

The mineral acid causes the hydrazoanisole to rearrange to dianisidine. Frequently, such process results in dianisidine which has an intense color that renders the dianisidine unsuitable for use in the manufacture of azo dyestuffs and for other purposes. Such color is almost impossible to remove and, in order to render the dianisidine suitable for use, it is necessary to subject it to repeated careful recrystallizations, or repeated treatments with decolorizing carbon or both.

It is an object of my invention to improve such process of preparing dianisidine so as to produce a product which is substantialy colorless and remains so over long periods of storage. Another object is to provide a process for preparing dianisidine which produces a product that does not require recrystallization or other decolorizing treatments, even after long periods of storage. Other objects are to advance the art. Still other objects will appear hereinafter.

The above and other objects of my invention may be acomplished by my novel process which comprises carrying out the rearrangement of hydrazoanisole in the presence of from about 2% to about 5% by weight, based on the hydrazoanisole, of an alkali metal salt of a dialkyl dithiocarbamic acid in which each alkyl group contains 1 to 4 carbon atoms.

I have found that the presence of such dithiocarbamates during the reaction prevents the formation of color so that the dianisidine, recovered from the reaction mixture, is a light gray to white product which appears to be colorless to the naked eye and nearly colorless when measured by a photelometer and has a higher melting point than the colored products obtained by the prior methods. The dianisidine produced by my method does not require recrystallization or other decolorizing treatment to render it suitable for use as a dyestuff intermediate or for other purposes and does not become discolored to an objectionable extent even after long periods of storage. Treatment of colored dianisidine, produced by prior methods, with the dithiocarbamates of my invention does not remove the color.

The dithiocarbamates which are to be employed are the alkali metal salts of the dialkyl dithiocarbamic acids in which each alkyl group contains from 1 to 4 carbon atoms. Preferably, the alkali metal wil be sodium or potassium. The alkyl groups may be the same or different groups selected from methyl, ethyl, propyl, isopropyl, butyl, isobutyl and tertiary butyl groups. I particularly prefer sodium dimethyl dithiocarbamate and sodium diethyl dithiocarbamate.

The hydrazoanisole may be made by any of the well known methods, such as by the reduction of o-nitroanisole by zinc and caustic or by catalytic hydrogen reduction. Frequently, the hydrazoanisole is prepared as a dilute solution in a solvent, such as a mixture of toluene and isopropanol. Such dilute solution will usually contain the hydrazoanisole in a concentration of from about 5% to about 15% by weight. After the removal of solid reactants, such solution may be treated directly with the aqueous solution of the mineral acid and the dithiocarbamate in accordance with my invention.

The non-oxidizing mineral acid will be any of such acids which are commonly employed for rearranging hydrazoanisole to dianisidine and will be employed in the usual dilute concentrations and in approximately stoichiometric amounts. Preferably, the mineral acid will be sulfuric acid or hydrochloric acid. Also, preferably, the dithiocarbamate will be dissolved in the aqueous solution of the mineral acid prior to admixture with the solution of hydrazoanisole.

After the reaction is complete, the dianisidine may be recovered from the reaction mixture by any of the usual methods. Ordinarily, this will be accomplished by neutralizing the reaction mixture with aqueous caustic alkali, removing the organic solvents by steam distillation or under reduced pressure, cooling to precipitate the dianisidine, filtering, washing and drying. After the organic solvent has been removed, it will frequently be desirable to add a small amount of a reducing agent, such as sodiumhydrosulfite, to the aqueous mixture to reduce a small amount of reducible colored impurities.

In the following example, the formation of yellow, red and blue-green impurities, as well as the total visible colored impurities, was evaluated as optical density of 1% solutions in methanol, determined in a Cenco-Sheard-Sanford Photelometer employing, respectively, blue (central maximum=410 mu), green (525 mu), red (610 mu) filters, and no filter. Distilled water was used as the reference standard, and the density is expressed as percent transmission. When the dianisidine contains colored impurities in an amount sufficient to reduce the total light transmission below 75%, blue transmission below 20%, green transmission below 60% and red transmission below 95%, the dianisidine is considered to be unsuitable for use in the manufacture of dyes and for other purposes without purification.

In order to more clearly illustrate my invention, preferred modes of carrying the same into effect and the advantageous results to be obtained thereby, the following example is given:

*Example*

A solution of hydrazoanisole, obtained by the reduction of 26 grams of ortho nitroanisole with 31 grams zinc and 2 grams sodium hydroxide in a mixture of 31 grams isopropl alcohol and 6 grams toluene at 50°–60° C. and diluted with 140 grams toluene used to extract the filtered zinc hydroxide sludge, was run into a solution of one gram of sodium diethyl dithiocarbamate trihydrate dissolved in 110 grams of 11% sulfuric acid cooled to $-5°$ to $0°$ C. The mixture was agitated at $0°\pm2°$ C. in an open vessel for 4 hours, then 16 hours at room temperature (30° C.) After adding sodium hydroxide as a 30% solution until alkaline to brilliant yellow indicator, the mixture was heated to 70°–75° C. and filtered. The solvent was removed by steam distillation, the aqueous nonvolatile fraction cooled to room temperature and the product filtered off. During the cooling period, 0.4 gram of sodium hydrosulfite was added to reduce colored impurities. The filter cake was washed with 3 grams toluene, then with water, and then dried in vacuo at 95°–97° C. The product was obtained as a white powder which melted at 137.5° C. Similar results were obtained with sodium dimethyl dithiocarbamate. A control sample, made by this procedure but omitting the dithiocarbamate, was blue grey in color and melted at 137.0° C.

The following color transmission values (obtained with the photelometer), of a 1% by volume solution in methyl alcohol, serve as a basis for comparison:

It will be understood that the preceding example is given for illustrative purposes solely and that my invention is not limited to the specific embodiments disclosed therein. On the other hand, it will be apparent to those skilled in the art that various modifications and variations may be made without departing from the spirit or scope of my invention. For example, the hydrazoanisole can be made by other known methods and other equivalent solvents may be substituted for those employed. Also, the other dithiocarbamates within the class disclosed may be substituted for those in the example and the proportions thereof may be varied within the limits disclosed. Further modifications may be made in the alkali metal hydroxide and the technique employed, and the sodium hydrosulfite may be omitted, if desired.

From the preceding description, it will be apparent that I have provided a simple and economical improvement in the process for preparing dianisidine whereby substantially colorless dianisidine is obtained and which remains substantially colorless over long periods of time. It is thus apparent that my invention constitutes a valuable contribution to and advance in the art.

I claim:

1. In the process for rearranging hydrazoanisole to dianisidine by the action of a dilute aqueous solution of a strong non-oxidizing mineral acid, the improvement which consists in carrying out the process in the presence of from about 2% to about 5% by weight, based on the hydrazoanisole, of an alkali metal salt of a dialkyl dithiocarbamic acid in which each alkyl group contains 1 to 4 carbon atoms.

2. In the process for rearranging hydrazoanisole to dianisidine by the action of a dilute aqueous solution of a strong non-oxidizing mineral acid, the improvement which consists in carrying out the process in the presence of from about 2% to about 5% by weight, based on the hydrazoanisole, of a sodium salt of a dialkyl dithiocarbamic acid in which each alkyl group contains 1 to 4 carbon atoms.

3. In the process for rearranging hydrazoanisole to dianisidine by the action of a dilute aqueous solution of a strong non-oxidizing mineral acid, the improvement which consists in carrying out the process in the presence of from about 2%

*Filter*

| Dithiocarbamate | Blue | Green | Red | Visual | M. P.,° C. |
|---|---|---|---|---|---|
| None | 64 | 65 | 70 | tan | 137.0 |
| Sodium diethyl dithiocarbamate | 77 | 79 | 83 | colorless | 137.5 |
| Sodium dimethyl dithiocarbamate | 80 | 85 | 90 | ...do | 137.8 |

After a shelf storage period of eleven months, the color comparison becomes even more significant.

| Dithiocarbamate | | Filter | | |
|---|---|---|---|---|
| | | Blue | Green | Red |
| None | initial | 64 | 65 | 70 |
| | final | 56 | 57 | 62 |
| Sodium diethyl dithiocarbamate | initial | 77 | 79 | 83 |
| | final | 72 | 73 | 77 |
| Sodium dimethyl dithiocarbamate | initial | 80 | 85 | 90 |
| | final | 70 | 73 | 80 |

The samples were stored in clear glass, lightly covered (screw cap bottles untightened), wide-mouth bottles exposed to daylight for the entire eleven month period.

to about 5% by weight, based on the hydrazoanisole, of sodium dimethyl dithiocarbamate.

4. In the process for rearranging hydrazoanisole to dianisidine by the action of a dilute aqueous solution of a strong non-oxidizing mineral acid, the improvement which consists in carrying out the process in the presence of from about 2% to about 5% by weight, based on the hydrazoanisole, of sodium diethyl dithiocarbamate.

5. The process for preparing substantially colorless dianisidine which comprises mixing a dilute solution of hydrazoanisole in a mixture of toluene and isopropanol with a dilute aqueous solution of a strong non-oxidizing mineral acid having dissolved therein from about 2% to about 5% by weight, based on the hydrazonanisole, of an alkali metal salt of a dialkyl dithiocarbamic acid in which each alkyl group contains 1 to 4 carbon atoms, agitating the mixture until the hydrazoanisole is rearranged to dianisidine, and then recovering the dianisidine from the reaction mixture.

6. The process for preparing substantially colorless dianisidine which comprises mixing a dilute solution of hydrazoanisole in a mixture of toluene and isopropanol with a dilute aqueous solution of a strong non-oxidizing mineral acid having dissolved therein from about 2% to about 5% by weight, based on the hydrazoanisole, of a sodium salt of a dialkyl dithiocarbamic acid in which each alkyl group contains 1 to 4 carbon atoms, agitating the mixture until the hydrazoanisole is rearranged to dianisidine, and then recovering the dianisidine from the reaction mixture.

7. The process for preparing substantially colorless dianisidine which comprises mixing a dilute solution of hydrazoanisole in a mixture of tolene and isopropanol with a dilute aqueous solution of a strong non-oxidizing mineral acid having dissolved therein from about 2% to about 5% by weight, based on the hydrazoanisole, of sodium dimethyl dithiocarbamate.

8. The process for preparing substantially colorless dianisidine which comprises mixing a dilute solution of hydrazoanisole in a mixture of toluene and isopropanol with a dilute aqueous solution of a strong non-oxidizing mineral acid having dissolved therein from about 2% to about 5% by weight, based on the hydrazoanisole, of sodium diethyl dithiocarbamate.

9. The process for preparing substantially colorless dianisidine which comprises mixing a dilute solution of hydrazoanisole in a mixture of toluene and isopropanol with a dilute aqueous solution of sulfuric acid having dissolved therein from about 2% to about 5% by weight, based on the hydrazoanisole, of an alkali metal salt of a dialkyl dithiocarbamic acid in which each alkyl group contains 1 to 4 carbon atoms, agitating the mixture until the hydrazoanisole is rearranged to dianisidine, and then recovering the dianisidine from the reaction mixture.

10. The process for preparing substantially colorless dianisidine which comprises mixing a dilute solution of hydrazoanisole in a mixture of toluene and isopropanol with a dilute aqueous solution of sulfuric acid having dissolved therein from about 2% to about 5% by weight, based on the hydrazoanisole, of a sodium salt of a dialkyl dithiocarbamic acid in which each alkyl group contains 1 to 4 carbon atoms, agitating the mixture until the hydrazoanisole is rearranged to dianisidine, and then recovering the dianisidine from the reaction mixture.

11. The process for preparing substantially colorless dianisidine which comprises mixing a dilute solution of hydrazoanisole in a mixture of toluene and isopropanol with a dilute aqueous solution of sulfuric acid having dissolved therein from about 2% to about 5% by weight, based on the hydrazoanisole, of sodium dimethyl dithiocarbamate, agitating the mixture until the hydrazoanisole is rearranged to dianisidine, and then recovering the dianisidine from the reaction mixture.

12. The process for preparing substantially colorless dianisidine which comprises mixing a dilute solution of hydrazoanisole in a mixture of toluene and isopropanol with a dilute aqueous solution of sulfuric acid having dissolved therein from about 2% to about 5% by weight, based on the hydrazoanisole, of sodium diethyl dithiocarbamate, agitating the mixture until the hydrazoanisole is rearranged to dianisidine, and then recovering the dianisidine from the reaction mixture.

ADRIAN L. LINCH.

No references cited.